May 26, 1931.    F. L. M. KENNEY    1,806,977
FILTER DEVICE
Filed Aug. 23, 1928    2 Sheets-Sheet 2
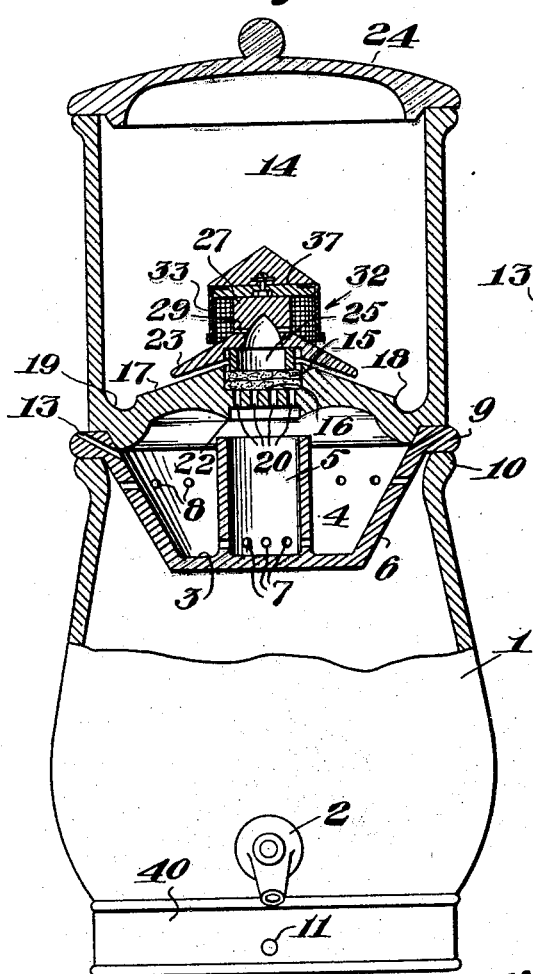
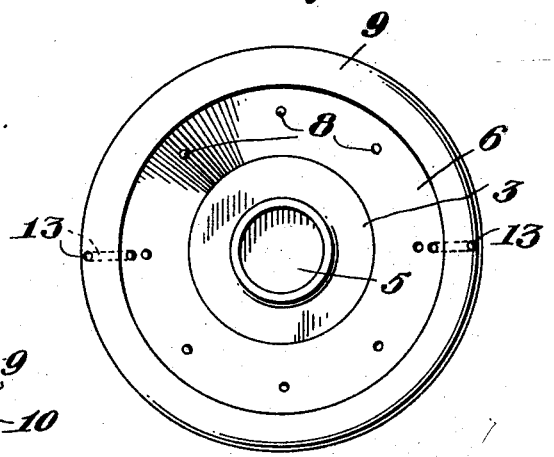
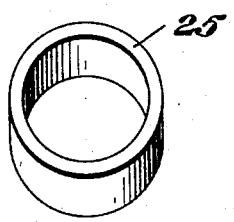
Inventor:
Francis L. M. Kenney Patented May 26, 1931

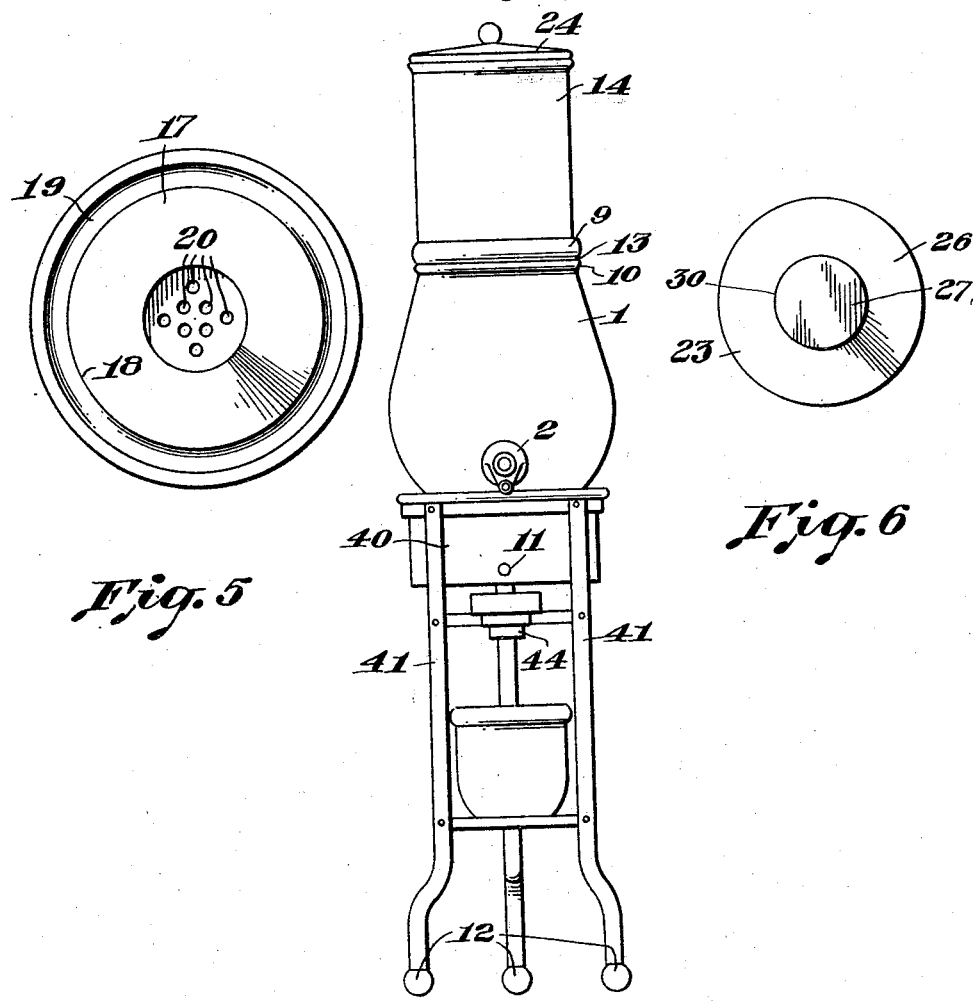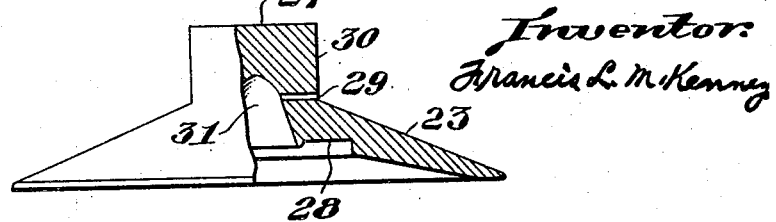

1,806,977

UNITED STATES PATENT OFFICE

FRANCIS L. M. KENNEY, OF LOS ANGELES, CALIFORNIA, ASSIGNOR, BY MESNE ASSIGNMENTS, TO FRANK L. MANION

FILTER DEVICE

Application filed August 23, 1928. Serial No. 301,485.

The object of my invention is to provide an improved portable, sanitary, efficient and economical water filter for domestic or other use, simple in construction and in operation and having easy accessibility of all parts and elements for cleaning, adjusting and renewal purposes.

I am aware that there are other devices for filtering water for domestic use by gravity seepage, etc.

My invention differs from and improves the past art, by the incorporation of new and additional parts and the improvement of other parts, improving the general construction of the filter and greatly adding to its efficiency.

The water to be filtered being placed into the top reservoir and after passing through a screen-curtain means covering the filter pad-guard, posed within said reservoir, passes thence through the ingress openings of said pad-guard to drip slowly upon and through asbestos filter pads, retained in the pad-cup means positioned in the floor of said reservoir, and thence passing through egress openings in the bottom of said pad-cup, drips into the inner chamber of a filter-bowl inserted between said top reservoir and a receptacle for the filtered water, positioned beneath said reservoir.

After passing through openings in the wall of said filter-bowl inner chamber into the outer chamber of said bowl, the filtered water finds exit therefrom via openings through the upper wall of said outer chamber, to drip thence into said receptacle for the filtered water.

My improved pad-guard, having a detached, adjustable ring base-means therefor, improves and facilitates the efficiency of the filter, by permitting a more perfect adjustment of weight upon the annular margin of the filter-pads, this being extremely important, to prevent unfiltered water and dirt from seeping thereunder.

My new screen-curtain means, improves the filter efficiency by excluding from the filter pads, much dirt that would otherwise find its way there and by preventing foreign matter from clogging or interfering with the ingress openings of said pad guard.

My improved filter-bowl, comprises a single piece member having two separate fixed chambers, positioned one within the other, for the retention of filter materials and carries egress openings through the lower wall of said inner chamber, for the passage of water therefrom and into the outer chamber of said bowl and openings through the outer wall of said filter-bowl, at the top margin thereof, for egress of water therefrom to drip thence into a receptacle for filtered water positioned beneath said filter bowl.

Said filter bowl carries a flange means around its outer top rim, to rest upon the top rim of said filtered water receptacle and form a support for said top reservoir; said flange means having vent-holes therethrough to admit fresh air to the charcoal retained in said chambers.

The details and structural arrangement are shown in the accompanying drawings, wherein:

Fig. I. Showing an elevation view of the assembled filter.

Fig. II. A semi-sectional view showing interior arrangement of the filter.

Fig. III. A semi-elevation sectional view of the pad-guard, showing the interior and exterior arrangement.

Fig. IV. A semi-elevation sectional view of the screen-curtain means.

Fig. V. A plan view of the top reservoir floor part.

Fig. VI. A plan of the pad-guard.

Fig. VII. A perspective of the ring base-means or sediment supporting ring.

Fig. VIII. A plan of the double-chamber filter bowl.

Owing to lack of space the drawings are not made to scale. Like parts are identified by same reference characters, throughout the several views.

I do not restrict myself to the precise details set forth and consider myself at liberty to make slight changes in the various parts, without departing from the scope and spirit of my claims.

As indicated in the drawings, my filter includes a top reservoir 14 for water to be filtered, a receptacle or water cooling jar 1 for the filtered water carrying a faucet means 2 for dispensing same and a filter-bowl 3 inserted between said parts 14 and 1, said filter-bowl 3 having a flange means 9 around its upper rim to rest upon the upper rim 10 of said receptacle 1 and form a support for said reservoir 14.

Said top reservoir 14 has a depression in the central portion of its bottom, forming a pad-cup 15 for the retention of filter-pads and having perforations 20 therethrough opening into said depression 15.

A filter-pad 16 rests within said pad-cup 15 and a supporting-ring base-means 25, forming a detached base for said pad-guard 26, rests upon the annular margin of said filter-pad 16 retaining said pad in proper shape and position and preventing unfiltered water and sediment from seeping thereunder, the pad-guard 26 being posed upon said supporting-ring 25. A manipulating of said supporting ring, facilitating a more perfect adjustment of pressure upon said filter pad margin and effectively preventing any seepage under said pad, which is extremely important.

Said pad-guard 26 comprises a hollow cylindrical or cone-like member, having a closed top 27 and an open bottom, the side walls 30 of said cylindrical member being provided with small holes or openings 29 penetrating through the upper part thereof, from its outer surface into its hollow interior 31, to permit unfiltered water passing through said openings 29 to drip slowly upon the asbestos pads 16 retained in said pad-cup 15, said pad-guard 26 carrying an outwardly extending skirt-flange 28 at the bottom of said side walls 30.

The water dripping upon and passing through said filter-pads 16 and passing through the perforations 20 in said pad-cup, passes thence into the inner chamber 5 of the filter-bowl 3 positioned beneath said top reservoir 14, said filter-bowl 3 comprises a single-piece member, having two separate, fixed chambers positioned one 5 within the other 4, for the retention of filter materials, egress openings 7 through the lower wall of said inner chamber 5, permitting the passage of water therefrom and into said outer chamber 4 and openings 8 through the outer wall of said filter-bowl, near the top thereof, permit the passage of water therefrom to drip thence into the receptacle 1 for filtered water, positioned beneath said filter bowl 3, said bowl carries a flange means 9 around the top of its wall 6 to rest upon the top rim 10 of said receptacle 1, said flange means 9 forming a support for said top reservoir 14, carries vent-holes therethrough to admit fresh air to the charcoal retained in said chambers 4 and 5.

My new screen-curtain means 32, rests upon said pad-guard 27, fitting over and covering the ingress openings 29 thereof, excluding much dirt or foreign matter that might tend to clog or interfere with said ingress openings 29 or to reduce the efficiency of said pads 16.

Said screen-curtain means 32 comprises a cone-like top-piece 36 and a curtain of screen-fabric 33, preferably metallic, suspended from around the periphery thereof, said top piece 36 to rest detachably upon the top end 27 of said pad-guard 26 and said curtain 33 suspending over the ingress openings 29 thereof.

A suitable metal standard may be provided, to support the assembled filter in convenient position for domestic use.

I claim as new and desire to secure by Letters Patent:

1. An improved sanitary pad-guard for filters, comprising a hollow cylindrical member having a closed top and an open bottom, said pad-guard having a detached, ring base-means positioned beneath the side-walls of said cylindrical member, said side-walls being provided with openings for the ingress of water, and an outwardly extending skirt-flange at the bottom of said side-walls.

2. In a filter in combination a reservoir for unfiltered water having a bottom, said bottom having a depression in the central portion thereof, and having perforations therethrough opening into said depression, a filter-pad in said depression a ring resting upon said filter-pad, and a pad-guard resting upon said ring, said pad-guard comprising a hollow cylindrical member having a closed top and an open bottom the side walls of said cylindrical member being provided with openings for the ingress of water and an outwardly extending skirt-flange at the bottom of said side walls.

3. In a filter in combination, a top reservoir for unfiltered water, a receptacle for the filtered water and a filter bowl inserted between said reservoir and said receptacle, said reservoir having a bottom, said bottom having a depression in the central portion thereof, and having perforations therethrough opening into said depression, a filter pad in said depression, a ring resting upon said filter pad and a pad guard resting upon said ring, said pad guard comprising a hollow cylindrical member having a closed top and an open bottom, the side walls of said cylindrical member being provided with openings for the ingress of water and an outwardly extending skirt flange at the bottom of said side walls, said filter bowl being a single piece member having two separate, fixed chambers containing filtering material positioned one within the other, said inner chamber having a circle of egress openings through its lower wall and said outer chamber having a circle of egress openings through the top margin of its outer wall, said bowl having a flange-means around its outer top rim to rest upon said receptacle, and form a support for said reservoir.

4. A new improved filter bowl for filters, comprising a single piece member having two separate, fixed chambers positioned one within the other, for retaining filter materials, said outer chamber occupying all space within said bowl excepting the center portion thereof occupied by said inner chamber, said inner chamber being cylindrical in form and having a circle of egress openings through its lower wall, and said outer chamber having a circle of egress openings through the top margin of its outer wall, said bowl carries a flanged means around the top of its outer wall adapted to rest upon the top rim of a receptacle for the filtered water and form a support for an unfiltered water reservoir.

5. In a filter in combination, a reservoir for unfiltered water having a bottom, said bottom having a depression in the central portion thereof, and having perforations therethrough opening into said depression, a filter pad in said depression a ring resting upon said filter pad and a pad guard resting upon said ring, said pad guard comprises a hollow cylindrical member having a closed top and an open bottom, the side walls of said cylindrical member being provided with openings for the ingress of water and an outwardly extending skirt flange at the bottom of said side walls, a screen-curtain means comprising a suitable top piece and a curtain of screen-fabric suspended from and around the periphery thereof, said top piece resting detachably upon the top of said pad guard, thus suspending said curtain over the ingress openings of said pad guard.

6. In a filter in combination, a screen-curtain means for filter pad guards, comprising a cone-like top-piece and a curtain of screen-fabric suspended from and around the periphery thereof, said top piece adapted to rest detachably upon the top end of said pad guard, with said curtain suspending over the ingress openings of said pad guard.

7. In a filter in combination, a top reservoir for unfiltered water, a receptacle for the filtered water and a bowl containing suitable filter materials inserted between said reservoir and said receptacle, said reservoir having a bottom, said bottom having a depression in the central portion thereof, and having perforations therethrough opening into said depression, a filter pad in said depression, a ring resting upon said filter pad and a pad guard resting upon said ring, said pad guard comprising a hollow cylindrical member having a closed top and an open bottom, the side walls of said cylindrical member being provided with openings for the ingress of water and an outwardly extending skirt flange at the bottom of said side walls, a screen-curtain means comprising a cone-like top-piece and a curtain of screen-fabric suspended from and around the periphery thereof, said top-piece resting detachably upon the top end of said pad guard, with said curtain positioned over the ingress openings thereof.

FRANCIS L. M. KENNEY.